United States Patent
Wang et al.

(10) Patent No.: US 12,276,832 B2
(45) Date of Patent: Apr. 15, 2025

(54) OPTICAL DEVICE, SUBSTRATE OPTICAL WAVEGUIDE ELEMENT, AND OPTICAL COMMUNICATION APPARATUS

(71) Applicant: FUJITSU OPTICAL COMPONENTS LIMITED, Kawasaki (JP)

(72) Inventors: Jianping Wang, Ota (JP); Akira Oka, Kawasaki (JP); Hoshihiko Toda, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 187 days.

(21) Appl. No.: 18/153,680

(22) Filed: Jan. 12, 2023

(65) Prior Publication Data

US 2023/0305228 A1    Sep. 28, 2023

(30) Foreign Application Priority Data

Mar. 23, 2022  (JP) ................................. 2022-047595

(51) Int. Cl.
*G02B 6/122* (2006.01)
*G02B 6/125* (2006.01)
G02B 6/293 (2006.01)

(52) U.S. Cl.
CPC ............ *G02B 6/122* (2013.01); *G02B 6/125* (2013.01); *G02B 6/2938* (2013.01)

(58) Field of Classification Search
CPC ...... G02B 6/125; G02B 6/122; G02B 6/2938; G02B 6/2813; G02B 6/1228
See application file for complete search history.

(56) References Cited

U.S. PATENT DOCUMENTS

2016/0282558 A1* 9/2016 Hutchison ................ G02B 6/14
2019/0258003 A1   8/2019 Shinohara et al.

FOREIGN PATENT DOCUMENTS

| JP | 2006-323135 | 11/2006 |
|---|---|---|
| JP | 2007-233294 | 9/2007 |
| WO | WO2018/078992 | 5/2018 |

OTHER PUBLICATIONS

J. M. Heaton, et al., "Novel 1-to-N way integrated optical beam splitters using symmetric mode mixing in GaAs/AlGaAs multi-mode waveguides", Appl. Phys. Lett., vol. 61, No. 15, pp. 1754-1756, 1992.

* cited by examiner

*Primary Examiner* — Michael P Mooney
(74) *Attorney, Agent, or Firm* — STAAS & HALSEY LLP

(57) ABSTRACT

An optical device includes an input waveguide and an output waveguide. The optical device includes an interference region that includes an input unit optically coupled with the input waveguide, that includes an output unit optically coupled with the output waveguide, and that has a larger waveguide width than a waveguide width of the input waveguide and a waveguide width of the output waveguide. Further, the optical device includes an unnecessary light waveguide that is included in the output unit in the interference region and that is arranged parallel to the output waveguide. The unnecessary light waveguide is a single-mode waveguide that includes a rib portion and a slab portion with a smaller thickness than a thickness of the rib portion, and that guides only a fundamental mode of light.

9 Claims, 14 Drawing Sheets

RELATED ART

RELATED ART

OPTICAL DEVICE, SUBSTRATE OPTICAL WAVEGUIDE ELEMENT, AND OPTICAL COMMUNICATION APPARATUS

CROSS-REFERENCE TO RELATED APPLICATION

This application is based upon and claims the benefit of priority of the prior Japanese Patent Application No. 2022-047595, filed on Mar. 23, 2022, the entire contents of which are incorporated herein by reference.

FIELD

The embodiments discussed herein are related to an optical device, a substrate optical waveguide element, and an optical communication apparatus.

BACKGROUND

In recent years, an optical device that includes a substrate optical waveguide element is actively developed to realize downsizing of an optical communication apparatus. As the substrate optical waveguide element, an optical device that implements various functions while guiding light by using an optical waveguide that includes a substrate, a core that is formed on the substrate, and a clad that covers the core is known.

To implement an optical integrated circuit in the optical communication apparatus, an optical device with a substrate optical waveguide element, such as a multi-mode interference (MMI) coupler, has been proposed as a structure for optical multiplexing and optical splitting (for example, Non Patent Literature 1). In the optical waveguide used for the MMI coupler, a channel waveguide (rectangular waveguide) that is able to strongly confine light and realize a small device is usually used.

FIG. 16 is an explanatory diagram illustrating an example of a configuration of an MMI coupler 100. The MMI coupler 100 illustrated in FIG. 16 is, for example, a 1×4 coupler with a single input and four outputs. The MMI coupler 100 includes a single input waveguide 102, four output waveguides 103 (103A, 103B, 103C, and 103D), and an interference region 104 the optically couples the single input waveguide 102 and the four output waveguides 103. The output waveguides 103 include the first output waveguide 103A, the second output waveguide 103B, the third output waveguide 103C, and the fourth output waveguide 103D. The interference region 104 is a multi-mode waveguide that includes an input unit 104A that is optically coupled with the single input waveguide 102 and an output unit 104B that is optically coupled with the four output waveguides 103, and guides a fundamental mode and a higher-order mode of light. As an operating principle of the MMI coupler 100, light that is input from the input waveguide 102 to the interference region 104 is expanded to a plurality of waveguide modes of the interference region 104 that serves as a multi-mode waveguide, and optical power is distributed to the four output waveguides 103 by an optical self-imaging effect.

FIG. 17 is an explanatory diagram illustrating an example of the optical self-imaging effect of the MMI coupler 100 illustrated in FIG. 16. The light that is expanded to each of the waveguide modes in the interference region 104 is guided by a certain distance in the interference region 104 and is condensed in a spot manner due to the self-imaging effect as illustrated in FIG. 17. Therefore, each of the output waveguides 103 that are optically coupled with the interference region 104 is arranged at a position at which each of four spots is formed due to the self-imaging effect in the output unit 104B of the interference region 104.

The interference region 104 functions as a splitter circuit that splits the light input from the input waveguide 102 to the four output waveguides 103. Further, the interference region 104 may also function as a multiplexer circuit that, when light is input from the four output waveguides 103, multiplexes the input light and outputs the multiplexed light from the single input waveguide 102.

In the interference region 104 of the conventional MMI coupler 100, light that is not optically coupled with the output waveguides 103 is reflected and radiated, and a part of the reflected and radiated light is optically coupled with the input waveguide 102. As a result, light that is input from the input waveguide 102 has an influence on the reflected light, so that optical resonance or optical interference may occur and the optical device may fail to operate normally. Therefore, the problem as described above will be described below by adopting a 2×1 MMI coupler.

FIG. 18 is an explanatory diagram illustrating an example of a configuration of a 2×1 MMI coupler 100A. The MMI coupler 100A illustrated in FIG. 18 includes the two input waveguides 102 (102A and 102B), the single output waveguide 103, and an interference region 104 the optically couples the two input waveguides 102 and the single output waveguide 103. The input waveguides 102 include the first input waveguide 102A and the second input waveguide 102B.

If the MMI coupler 100A is used as a multiplexer circuit, in principle, light with ½ of input power from each of the input waveguides 102 is optically coupled with the output waveguide 103. However, in the MMI coupler 100A, light with the remaining ½ of the input power is reflected or radiated by a discontinuous portion 114A and a discontinuous portion 114B of the output unit 104B in the interference region 104, and the reflected light is repeatedly reflected in the interference region 104. As a result, a part of the power is input to each of the input waveguides 102.

Therefore, to cope with the situation as described above, an MMI coupler in which unnecessary light waveguides are arranged on both sides of the output waveguide 103 such that the reflected light is optically coupled in the unnecessary light waveguides to reduce an amount of reflected light that is input to the input waveguides 102 is known. FIG. 19 is an explanatory diagram illustrating an example of a configuration of a conventional MMI coupler 100B.

The MMI coupler 100B illustrated in FIG. 19 includes the two input waveguides 102 (102A and 102B), the single output waveguide 103, the interference region 104 the optically couples the two input waveguides 102 and the single output waveguide 103, and two unnecessary light waveguides 105. The interference region 104 includes the input unit 104A that is optically coupled with the input waveguides 102 and the output unit 104B that is optically coupled with the output waveguide 103. The output unit 104B is optically coupled with the two unnecessary light waveguides 105 that are arranged on both sides of the output waveguide 103. The unnecessary light waveguides 105 are channel waveguides that optically couple reflected light generated in the interference region 104.

In the MMI coupler 100B, the unnecessary light waveguides 105 that are configured with multi-mode waveguides or single-mode waveguides are arranged on the both sides of the output waveguide 103 that is located in the output unit 104B of the interference region 104. As a result, the reflected light that is generated in the interference region 104 is optically coupled by the unnecessary light waveguides 105, so that it is possible to reduce the amount of reflected light that is input to the input waveguides 102.

Patent Literature 1: Japanese Laid-open Patent Publication No. 2007-233294

Patent Literature 2: International Publication Pamphlet No. 2018/078992

Patent Literature 3: Japanese Laid-open Patent Publication No. 2006-323135

Non Patent Document 1: J. M. Heaton, R. M. Jenkins, D. R. Wight, J. T. Parker, J. C. H. Birbeck, and K. P. Hilton, "Novel 1-to-N way integrated optical beam splitters using symmetric mode mixing in GaAs/AlGaAs multi-mode waveguides", Appl. Phys. Lett., vol. 61, no. 15, pp. 1754-1756, 1992.

However, in the conventional MMI coupler 100B, if the unnecessary light waveguides 105 are configured with multi-mode waveguides of channel waveguides, a higher-order mode is guided in the unnecessary light waveguides 105. However, in the multi-mode waveguides, confinement of the higher-order mode of light is weakened, so that the higher-order mode of light that is guided in the unnecessary light waveguides 105 is likely to be optically coupled with the output waveguide 103. As a result, the higher-order mode of light that is optically coupled with the output waveguide 103 interferes with the light that is guided by the output waveguide 103, so that ripple occurs in a wavelength region and the optical device may fail to operate normally.

Furthermore, in the conventional MMI coupler 100B, if the unnecessary light waveguides 105 are configured with single-mode waveguides of channel waveguides, waveguide widths of the unnecessary light waveguides 105 are reduced, so that a ratio of the discontinuous portion of the output unit 104B in which reflected light is generated inside the interference region 104 increases. As a result, the unnecessary light waveguides 105 fail to fully reduce the amount of reflected light that is input to the input waveguides 102.

Therefore, a relationship between the waveguide widths of the unnecessary light waveguides 105 and the amount of reflected light in the conventional 2×1 MMI coupler 100B will be described below based on a simulation result that is calculated by the finite-difference time-domain method. FIG. 20 is an explanatory diagram illustrating an example of a relationship between the waveguide widths of the unnecessary light waveguides 105 and the amount of reflected light in the conventional MMI coupler 100B. The amount of reflected light is calculated by, for example, 10*Log 10[P(reflection)/P(input)]. P(input) is optical power (mW) that is input from the input waveguide 102 of the MMI coupler 100B, and P(reflection) is reflected optical power (mW) that is detected by the same input waveguide 102.

It is assumed that the 2-1 MMI coupler 100B as a simulation target adopts, as each of the unnecessary light waveguides 105, a channel optical waveguide in which a core is made of Si, a clad is made of $SiO_2$, and a thickness h of the core is set to 0.22 micrometer (n). Further, a reflected light amount of reflected light that is input to the input waveguides 102 when light with a light wavelength of 1550 nanometers (nm) is input from the input waveguides 102 and waveguide widths w of the unnecessary light waveguides 105 are changed is calculated.

As illustrated in FIG. 20, the amount of reflected light decreases with an increase in the waveguide widths w of the unnecessary light waveguides 105. In other words, with an increase in the waveguide widths w of the unnecessary light waveguides 105, the discontinuous portion of the output unit 104B in the interference region 104 is reduced, so that the amount of reflected light is reduced. Further, to meet a single mode condition under which it is difficult to guide a higher-order mode in the unnecessary light waveguide 105, the waveguide widths w of the unnecessary light waveguides 105 need to be set to 0.4 μm or less; however, it is difficult to fully reduce the amount of reflected light that is input from the interference region 104 to the input waveguides 102. Therefore, in the MMI coupler 100B, there is a need for the unnecessary light waveguides 105 that meet the single mode condition and that is able to reduce the amount of reflected light input to the input waveguides 102.

SUMMARY

According to an aspect of an embodiment, an optical device includes an input waveguide, an output waveguide, an interference region and an unnecessary light waveguide. The interference region includes an input unit optically coupled with the input waveguide, includes an output unit optically coupled with the output waveguide, and has a larger waveguide width than a waveguide width of the input waveguide and a waveguide width of the output waveguide. The unnecessary light waveguide is included in the output unit in the interference region and is arranged parallel to the output waveguide. The unnecessary light waveguide is a single-mode waveguide that includes a rib portion and a slab portion with a smaller thickness than a thickness of the rib portion, and that guides only a fundamental mode of light.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Meanwhile, the disclosed technology is not limited by the embodiments below. In addition, the embodiments described below may be combined appropriately as long as there is no contradiction.

[a] First Embodiment

Figure 1:
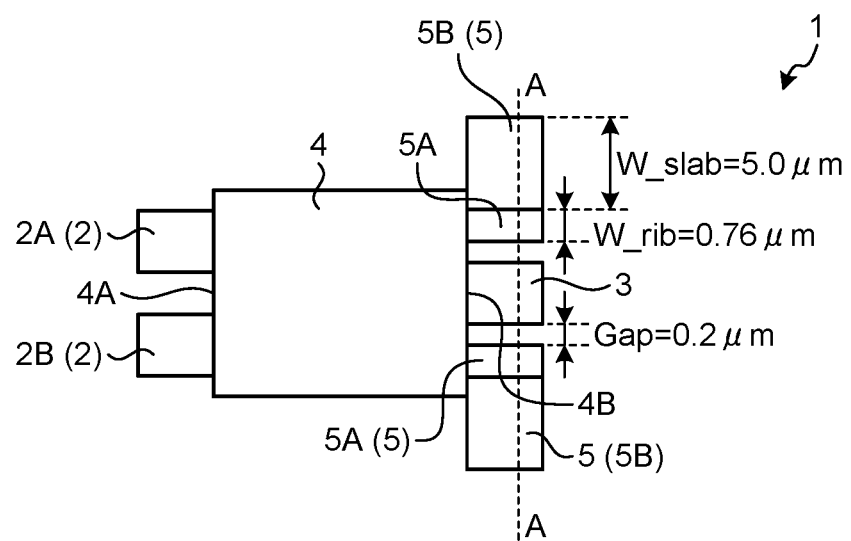
FIG. 1 is an explanatory diagram illustrating an example of a configuration of an MMI coupler of a first embodiment.

FIG. 1 is an explanatory diagram illustrating an example of a configuration of an MMI coupler 1 of a first embodiment. The MMI coupler 1 illustrated in FIG. 1 is a substrate optical waveguide element, such as a 2×1 MMI coupler with two inputs and a single output. The MMI coupler 1 includes two input waveguides 2 (2A and 2B), a single output waveguide 3, an interference region 4 the optically couples the two input waveguides 2 and the single output waveguide 3, and two unnecessary light waveguides 5. The input waveguides 2 include the first input waveguide 2A and the second input waveguide 2B.

Each of the input waveguides 2 is a rib optical waveguide that includes a rib portion and a slab portion that has a smaller thickness than a core thickness of the rib portion. The output waveguide 3 is also a rib optical waveguide that includes a rib portion and a slab portion that has a smaller thickness than a core thickness of the rib portion. Further, the interference region 4 is also a rib optical waveguide that includes a rib portion and a slab portion that has a smaller thickness than a core thickness of the rib portion. Meanwhile, for convenience of explanation, an example is illustrated in which the input waveguides 2, the output waveguide 3, and the interference region 4 are the rib optical waveguides, but embodiments are not limited to this example; for example, the waveguides may be channel waveguides or ridge waveguides, and appropriate changes may be made.

The interference region 4 is a waveguide that includes an input unit 4A optically coupled with the two input waveguides 2, includes an output unit 4B optically coupled with the single output waveguide 3, and causes light that is input from the two input waveguides 2 to be output from the single output waveguide 3. The interference region 4 is a multimode waveguide that has a larger waveguide width than waveguide widths of the input waveguides 2 and the output waveguide 3, and that guides a fundamental mode and a higher-order mode of light.

Further, in the output unit 4B in the interference region 4, the output waveguide 3 is arranged at a spot position at which the light input from the two input waveguides 2 is condensed. Furthermore, in the output unit 4B in the interference region 4, the two unnecessary light waveguides 5 are arranged on both sides of the output waveguide 3.

Figure 2:
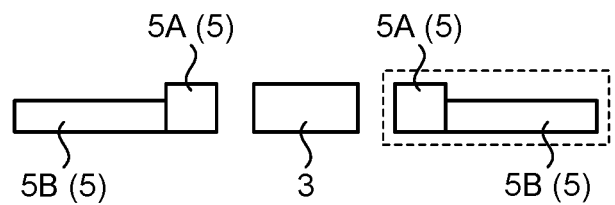
FIG. 2 is an explanatory diagram illustrating an example of a schematic cross-sectional portion taken along a line A-A in FIG. 1.

FIG. 2 is an explanatory diagram illustrating an example of a schematic cross-sectional portion taken along a line A-A in FIG. 1. The schematic A-A cross-sectional portion illustrated in FIG. 2 is a schematic cross-sectional portion of the two unnecessary light waveguides 5 and the single output waveguide 3 that are optically coupled with the output unit 4B in the interference region 4. Each of the unnecessary light waveguides 5 has an asymmetric rib optical waveguide structure that includes a rib portion 5A and a slab portion 5B that has a smaller thickness than a cores thickness of the rib portion 5A. It is assumed that a waveguide width Wrib of the rib portion 5A is set to, for example, 0.76 μm and a waveguide width Wslab of the slab portion 5B is set to, for example, 5.0 μm.

Each of the unnecessary light waveguides 5 is configured such that the rib portion 5A is arranged at the side of the output waveguide 3, an interval between the rib portion 5A and the output waveguide 3 is set to, for example, 0.2 μm, and each of the unnecessary light waveguides 5 is optically coupled with the output unit 4B in the interference region 4. Meanwhile, it is possible to reduce an amount of reflected light that is input from the interference region 4 to the input waveguides 2 by reducing a size of the interval. Each of the unnecessary light waveguides 5 is a single-mode waveguide that guides only a fundamental mode of light. A thickness of the slab portion 5B in each of the unnecessary light waveguides 5 is increased as compared to a thickness of the slab portion in each of the input waveguides 2, the output waveguide 3, and the interference region 4.

Figure 3:
FIG. 3 is an explanatory diagram illustrating an example of a state of a waveguide mode of light that is guided in an unnecessary light waveguide.

FIG. 3 is an explanatory diagram illustrating an example of a state of a waveguide mode of light that is guided in each of the unnecessary light waveguides 5. The unnecessary light waveguide 5 includes the slab portion 5B, so that optical confinement in the rib portion 5A is weakened; therefore, even if the waveguide width of the rib portion 5A is set to the same as a waveguide width of a channel waveguide, a higher-order mode of light is less likely to be guided and only a fundamental mode of light is guided. Therefore, even if the waveguide width of the rib portion 5A in each of the unnecessary light waveguides 5 is increased, a single mode condition for guiding only the fundamental mode of light is met. By meeting the single mode condition, it is possible to prevent an influence of the higher-order mode of light guided in the unnecessary light waveguides 5 on the output waveguide 3. As a result, the unnecessary light waveguides 5 are able to fully reduce the amount of reflected light of light that is input from the interference region 4 to the input waveguides 2 while meeting the single mode condition.

Figure 4:
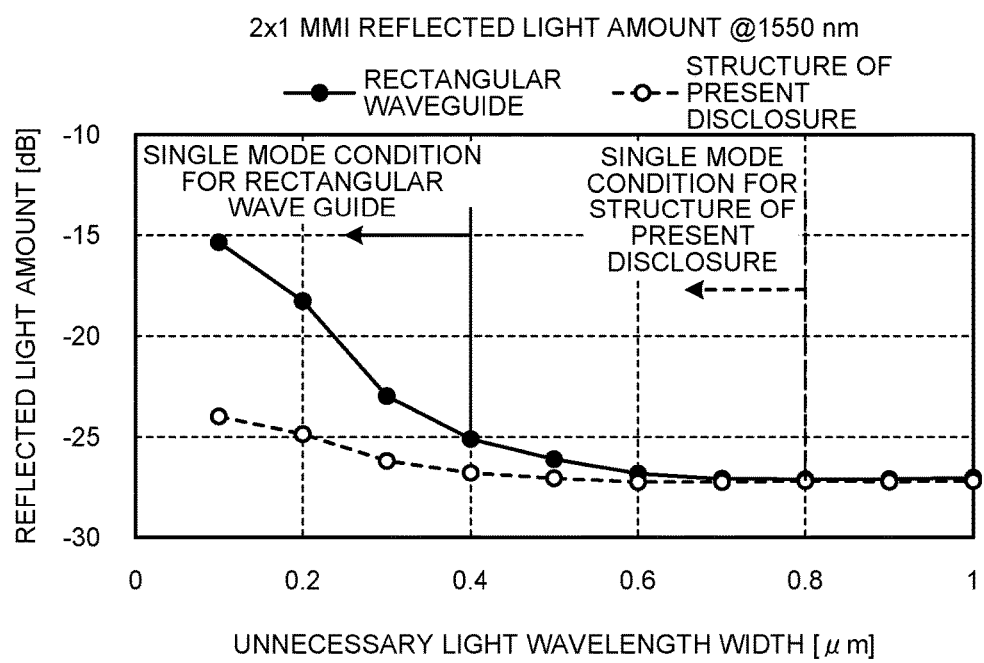
FIG. 4 is an explanatory diagram illustrating an example of a relationship between a waveguide width of the unnecessary light waveguide and an amount of reflected light in the MMI coupler of the first embodiment.

FIG. 4 is an explanatory diagram illustrating an example of a comparison result of the amount of reflected light corresponding to the waveguide widths of the unnecessary light waveguides 5 (105) in the MMI coupler 1 of the first embodiment and the conventional MMI coupler 100B. The MMI coupler 1 of the first embodiment includes the unnecessary light waveguides 5 that are asymmetric rib optical waveguides, whereas the conventional MMI coupler 100B includes the unnecessary light waveguides 105 that are channel waveguides. In the conventional MMI coupler 100B, the unnecessary light waveguides 105 are the channel waveguides, so that the waveguide widths of the unnecessary light waveguides 105 are equal to or smaller than 0.4 µm that meets the single mode condition, but it is difficult to fully reduce the amount of reflected light that is input to the input waveguides 2. In contrast, the unnecessary light waveguides 5 in the MMI coupler 1 of the first embodiment are the asymmetric rib optical waveguides, so that the waveguide widths of the unnecessary light waveguides 5 are equal to or smaller than 0.8 µm that meets the single mode condition, and it is possible to fully reduce the amount of reflected light that is input to the input waveguide 2.

Figure 5:
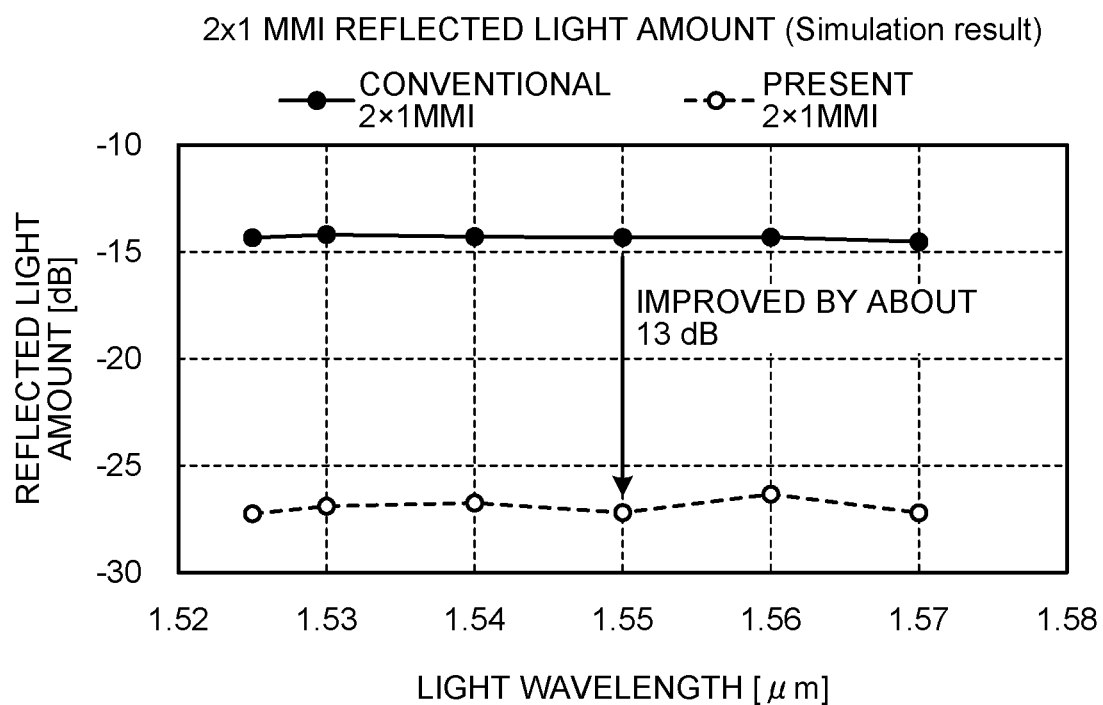
FIG. 5 is an explanatory diagram illustrating an example of a relationship between the amount of reflected light and a light wavelength of the MMI coupler of the first embodiment and a conventional MMI coupler.

FIG. 5 is an explanatory diagram illustrating an example of a comparison result of the amount of reflected light corresponding to a light wavelength in the unnecessary light waveguides 5 (105) of the MMI coupler 1 of the first embodiment and the conventional MMI coupler 100B. Meanwhile, it is assumed that the wavelength of light to be used is in a range of 1525 nm to 1570 nm that includes a C band. The amount of reflected light in the MMI coupler 1 of the first embodiment is improved by about 13 dB as compared to the amount of reflected light in the conventional MMI coupler 100B.

In the MMI coupler 1 of the first embodiment, the unnecessary light waveguides 5 having the asymmetric rib optical waveguide structures are arranged parallel to the output waveguide 3 in the output unit 4B in the interference region 4. As a result, the unnecessary light waveguides 5 are able to fully reduce the amount of reflected light that is input from the interference region 4 to the input waveguides 2, while meeting the single mode condition.

Meanwhile, the 2×1 MMI coupler is illustrated as an example of the MMI coupler 1 of the first embodiment, but embodiments are not limited to this example and appropriate changes may be made. Modifications of the MMI coupler 1 of the first embodiment are illustrated in FIG. 6A to FIG. 6F.

Figure 6A:
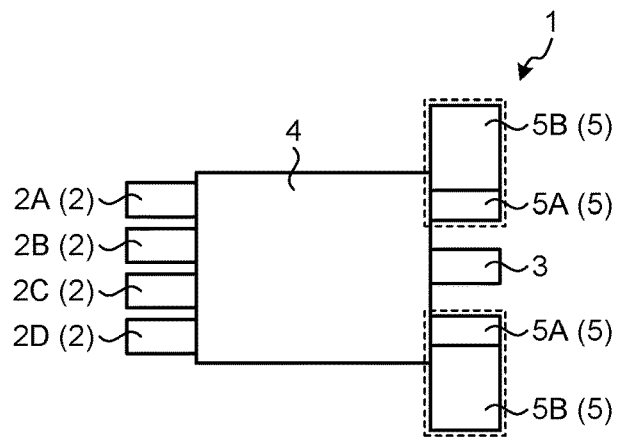
FIG. 6A is an explanatory diagram illustrating an example of a configuration of a 4×1 MMI coupler according to a modification of the first embodiment.

FIG. 6A is an explanatory diagram illustrating an example of a configuration of the 4×1 MMI coupler 1 according to a modification of the first embodiment. The MMI coupler 1 illustrated in FIG. 6A includes the four input waveguides 2 (2A, 2B, 2C, and 2D), the single output waveguide 3, and the interference region 4 that optically couples the four input waveguides 2 and the single output waveguide 3. In the output unit 4B in the interference region 4, the unnecessary light waveguides 5 are arranged on the both sides of the output waveguide 3.

Figure 6B:
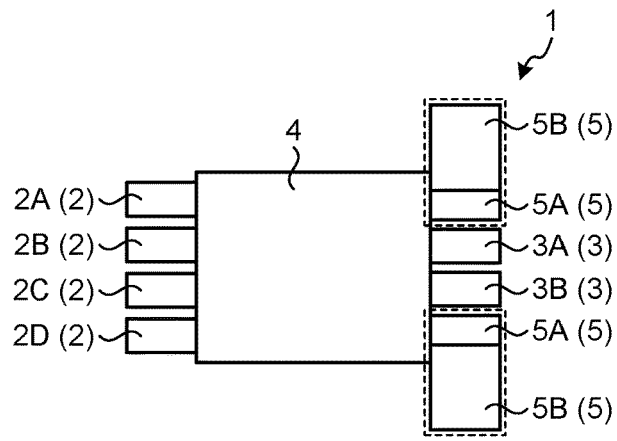
FIG. 6B is an explanatory diagram illustrating an example of a configuration of a 4×2 MMI coupler according to a modification of the first embodiment.

FIG. 6B is an explanatory diagram illustrating an example of a configuration of the 4×2 MMI coupler 1 according to a modification of the first embodiment. The MMI coupler 1 illustrated in FIG. 6B includes the four input waveguides 2 (2A, 2B, 2C, and 2D), the two output waveguides 3 (3A and 3B), and the interference region 4 that optically couples the four input waveguides 2 and the two output waveguides 3. In the output unit 4B in the interference region 4, the unnecessary light waveguides 5 are arranged on both sides of the two output waveguides 3.

Figure 6C:
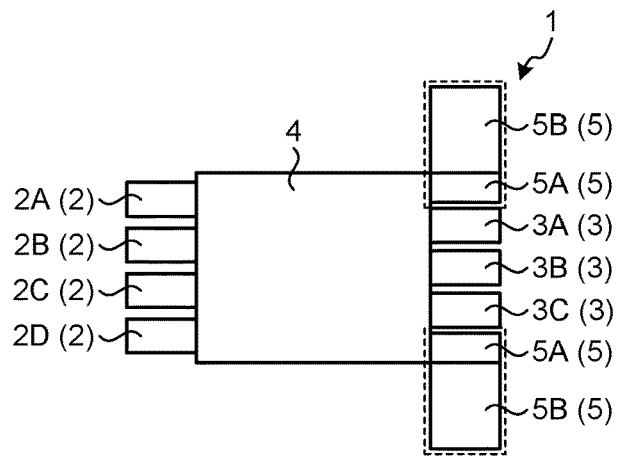
FIG. 6C is an explanatory diagram illustrating an example of a configuration of a 4×3 MMI coupler according to a modification of the first embodiment.

FIG. 6C is an explanatory diagram illustrating an example of a configuration of the 4×3 MMI coupler 1 according to a modification of the first embodiment. The MMI coupler 1 illustrated in FIG. 6C includes the four input waveguides 2 (2A, 2B, 2C, and 2D), the three output waveguides 3 (3A, 3B, and 3C), and the interference region 4 that optically couples the four input waveguides 2 and the three output waveguides 3. In the output unit 4B in the interference region 4, the unnecessary light waveguides 5 are arranged on both sides of the three output waveguides 3.

Figure 6D:
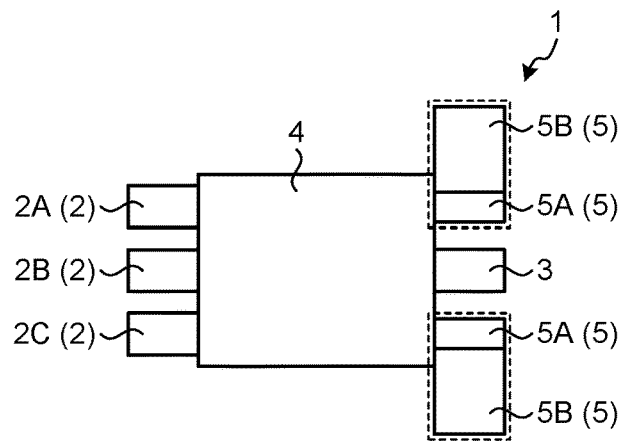
FIG. 6D is an explanatory diagram illustrating an example of a configuration of a 3×1 MMI coupler according to a modification of the first embodiment.

FIG. 6D is an explanatory diagram illustrating an example of a configuration of the 3×1 MMI coupler 1 according to a modification of the first embodiment. The MMI coupler 1 illustrated in FIG. 6D includes the three input waveguides 2 (2A, 2B, and 2C), the single output waveguide 3, and the interference region 4 that optically couples the three input waveguides 2 and the single output waveguide 3. In the output unit 4B in the interference region 4, the unnecessary light waveguides 5 are arranged on both sides of the single output waveguide 3.

Figure 6E:
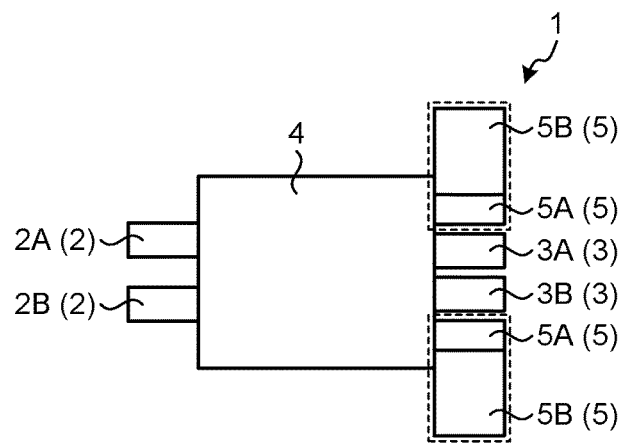
FIG. 6E is an explanatory diagram illustrating an example of a configuration of a 2×2 MMI coupler according to a modification of the first embodiment.

FIG. 6E is an explanatory diagram illustrating an example of a configuration of the 2×2 MMI coupler 1 according to a modification of the first embodiment. The MMI coupler 1 illustrated in FIG. 6E includes the two input waveguides 2 (2A and 2B), the two output waveguides 3 (3A and 3B), and the interference region 4 that optically couples the two input waveguides 2 and the two output waveguides 3. In the output unit 4B in the interference region 4, the unnecessary light waveguides 5 are arranged on both sides of the two output waveguides 3.

Figure 6F:
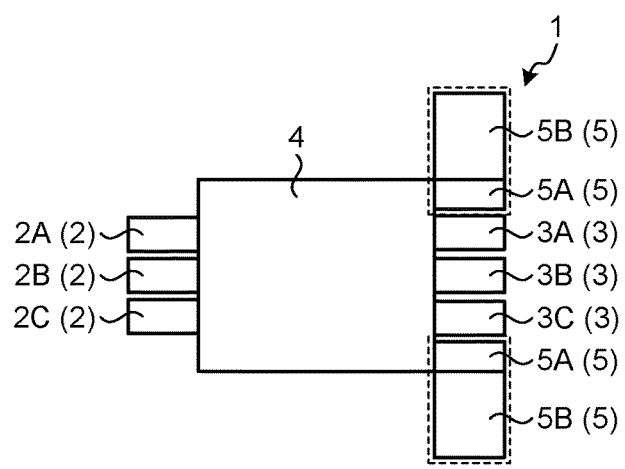
FIG. 6F is an explanatory diagram illustrating an example of a configuration of a 3×3 MMI coupler according to a modification of the first embodiment.

FIG. 6F is an explanatory diagram illustrating an example of a configuration of the 3×3 MMI coupler 1 according to a modification of the first embodiment. The MMI coupler 1 illustrated in FIG. 6F includes the three input waveguides 2 (2A, 2B, and 2C), the three output waveguides 3 (3A, 3B, and 3C), and the interference region 4 that optically couples the three input waveguides 2 and the three output waveguides 3. In the output unit 4B in the interference region 4, the unnecessary light waveguides 5 are arranged on both sides of the three output waveguides 3.

The MMI couplers 1 illustrated in FIG. 6A to FIG. 6F are configured such that the unnecessary light waveguides 5 having the asymmetric rib optical waveguide structures are arranged parallel to the output waveguide 3 in the output unit 4B in the interference region 4. As a result, the unnecessary light waveguides 5 are able to fully reduce the amount of reflected light that is input from the interference region 4 to the input waveguide 2, while meeting the single mode condition.

The MMI coupler 1 is an MMI couple that is applicable to M×N, where M is the number of the input waveguides 2 and N is the number of the output waveguides 3.

Meanwhile, the example has been described in which the MMI coupler 1 of the first embodiment is configured such that the unnecessary light waveguides 5 are arranged on the both sides of the output waveguide 3 in the output unit 4B in the interference region 4; however, the unnecessary light waveguide 5 may be arranged on one side of the output waveguide 3 and appropriate changes may be made. Furthermore, the example has been described in which the MMI coupler 1 of the first embodiment is a unidirectional coupler in which light is guided from the input waveguides 2 to the output waveguide 3. However, the technology is applicable to a bidirectional coupler in which light is bi-directionally guided between the input waveguides 2 and the output waveguide 3, and this embodiment will be described below as a second embodiment. Meanwhile, the same components as those of the MMI coupler 1 of the first embodiment are denoted by the same reference symbols, and explanation of the same components and the same operation will be omitted.

[b] Second Embodiment

Figure 7:
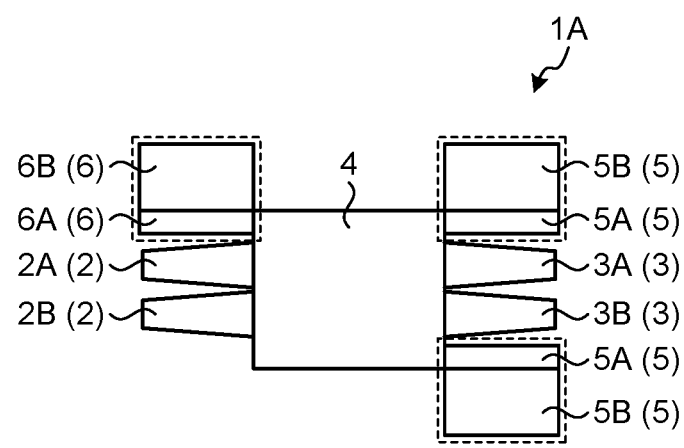
FIG. 7 is an explanatory diagram illustrating an example of a configuration of an MMI coupler of a second embodiment.

FIG. 7 is an explanatory diagram illustrating an example of a configuration of an MMI coupler 1A of the second embodiment. The MMI coupler 1A illustrated in FIG. 7 is a coupler in which light is bi-directionally guided. The MMI coupler 1A includes the two input waveguides 2 (2A and 2B), the single output waveguide 3, the interference region 4, and the two unnecessary light waveguides 5 that are arranged in the output unit 4B in the interference region 4. The two input waveguides 2 are referred to as the first input waveguide 2A and the second input waveguide 2B. The MMI coupler 1A is configured such that a single unnecessary light waveguide 6 is arranged in the vicinity of the first input waveguide 2A that is arranged in the input unit 4A in the interference region 4.

The unnecessary light waveguide 6 that is arranged in the input unit 4A in the interference region 4 has an asymmetric rib optical waveguide structure that includes a rib portion 6A and a slab portion 6B that has a smaller thickness than a core thickness of the rib portion 6A. The unnecessary light waveguide 6 is a single-mode waveguide that guides only a fundamental mode of light.

The MMI coupler 1A of the second embodiment is configured such that the unnecessary light waveguides 5 having the asymmetric rib optical waveguide structures are arranged in the output unit 4B in the interference region 4, and the unnecessary light waveguide 6 having the asymmetric rib optical waveguide structure is arranged in the input unit 4A in the interference region 4. As a result, even in the bi-directional MMI coupler 1A, the unnecessary light waveguides 5 and 6 are able to fully reduce the amount of reflected light that is input from the interference region 4 to the input waveguide 2 and the output waveguide 3, while meeting the single mode condition.

Meanwhile, in the MMI coupler 1A of the second embodiment, the example has been described in which the single unnecessary light waveguide 6 is arranged in the vicinity of the first input waveguide 2A in the input unit 4A in the interference region 4. However, it may be possible to arrange the single unnecessary light waveguide 6 in the vicinity of the second input waveguide 2B instead of the first input waveguide 2A, and appropriate changes may be made. Furthermore, it may be possible to arrange the unnecessary light waveguides 6 on an outer side of the first input waveguide 2A and an outer side of the second input waveguide 2B in the input unit 4A, and appropriate changes may be made.

In the MMI coupler 1A of the second embodiment, the example has been described in which the unnecessary light waveguides 6 and 5 area arranged in the input unit 4A and the output unit 4B in the interference region 4, but embodiments are not limited to this example, and appropriate changes may be made. Modifications of the MMI coupler 1A of the second embodiment are illustrated in FIG. 8A to FIG. 8D.

Figure 8A:
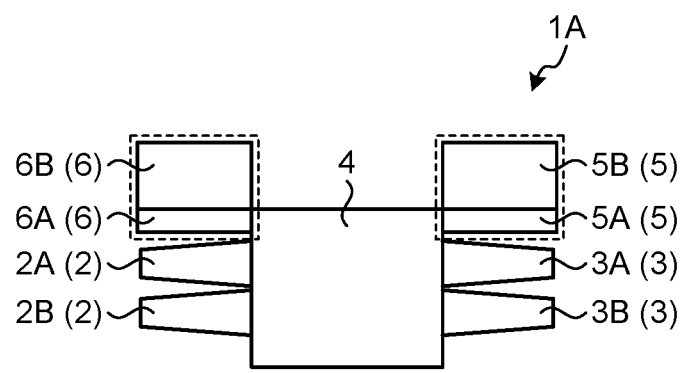
FIG. 8A is an explanatory diagram illustrating an example of a configuration of an MMI coupler (with 1×1 unnecessary light waveguides) according to a modification of the second embodiment.

FIG. 8A is an explanatory diagram illustrating an example of a configuration of the MMI coupler 1A (with 1×1 unnecessary light waveguides) according to a modification of the second embodiment. The MMI coupler 1A illustrated in FIG. 8A includes the two input waveguides 2 (2A and 2B), the two output waveguides 3 (3A and 3B), and the interference region 4 that optically couples the two input waveguides 2 and the two output waveguides 3. The two input waveguides 2 are referred to as the first input waveguide 2A and the second input waveguide 2B, and the two output waveguides 3 are referred to as the first output waveguide 3A and the second output waveguide 3B.

The MMI coupler 1A illustrated in FIG. 8A is configured such that the unnecessary light waveguide 6 is arranged in a parallel manner on an outer side of the first input waveguide 2A in the input unit 4A in the interference region 4, and the unnecessary light waveguide 5 is arranged in a parallel manner on an outer side of the first output waveguide 3A in the output unit 4B in the interference region 4.

Figure 8B:
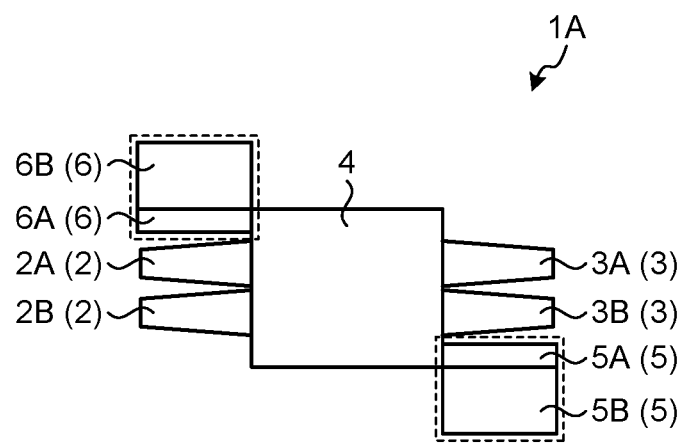
FIG. 8B is an explanatory diagram illustrating an example of a configuration of an MMI coupler (with 1×1 unnecessary light waveguides) according to a modification of the second embodiment.

FIG. 8B is an explanatory diagram illustrating an example of a configuration of the MMI coupler 1A (with 1×1 unnecessary light waveguides) according to a modification of the second embodiment. Meanwhile, the same components as those of the MMI coupler 1A illustrated in FIG. 8A are denoted by the same reference symbols, and explanation of the same components and the same operation will be omitted. The MMI coupler 1A illustrated in FIG. 8B is configured such that the unnecessary light waveguide 6 is arranged in a parallel manner on the outer side of the first input waveguide 2A in the input unit 4A in the interference region 4, and the unnecessary light waveguide 5 is arranged in a parallel manner on an outer side of the second output waveguide 3B in the output unit 4B in the interference region 4.

Figure 8C:
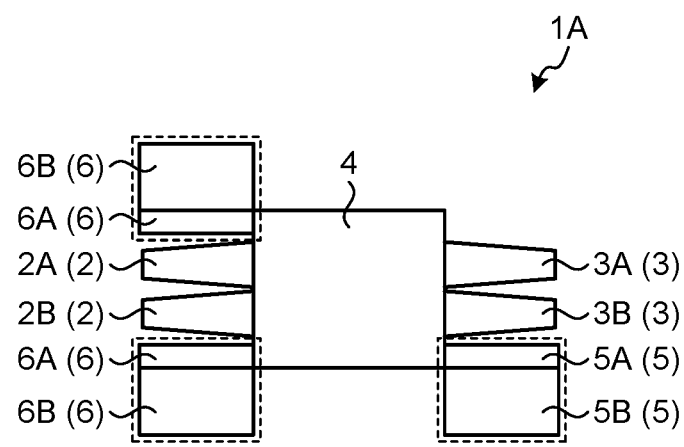
FIG. 8C is an explanatory diagram illustrating an example of a configuration of an MMI coupler (with 2×1 unnecessary light waveguides) according to a modification of the second embodiment.

FIG. 8C is an explanatory diagram illustrating an example of a configuration of the MMI coupler 1A (with 2×1 unnecessary light waveguides) according to a modification of the second embodiment. Meanwhile, the same components as those of the MMI coupler 1A illustrated in FIG. 8A are denoted by the same reference symbols, and explanation of the same components and the same operation will be omitted. The MMI coupler 1A illustrated in FIG. 8C is configured such that the unnecessary light waveguide 6 is arranged in a parallel manner on the outer side of the first input waveguide 2A and the unnecessary light waveguides 6 is arranged in a parallel manner on an outer side of the second input waveguide 2B in the input unit 4A in the interference region 4. Further, the MMI coupler 1A is configured such that the unnecessary light waveguides 5 is arranged in a parallel manner on the outer side of the second output waveguide 3B in the output unit 4B in the interference region 4.

Figure 8D:
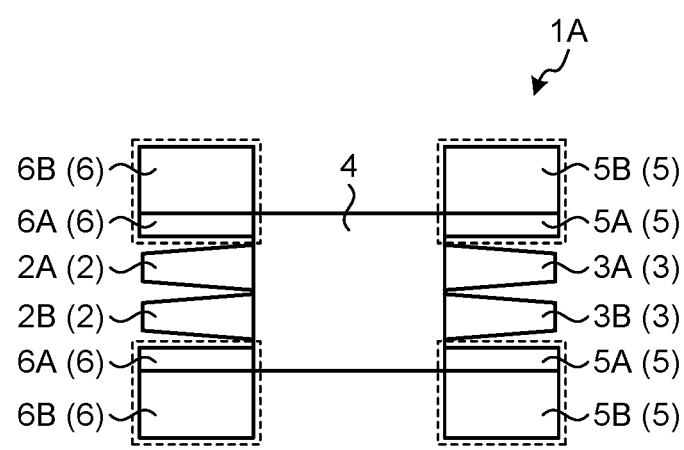
FIG. 8D is an explanatory diagram illustrating an example of a configuration of an MMI coupler (with 2×2 unnecessary light waveguides) according to a modification of the second embodiment.

FIG. 8D is an explanatory diagram illustrating an example of a configuration of the MMI coupler 1A (with 2×2 unnecessary light waveguides) according to a modification of the second embodiment. Meanwhile, the same components as those of the MMI coupler 1A illustrated in FIG. 8A are denoted by the same reference symbols, and explanation of the same components and the same operation will be omitted. The MMI coupler 1A illustrated in FIG. 8D is configured such that the unnecessary light waveguide 6 is arranged in a parallel manner on the outer side of the first input waveguide 2A and the unnecessary light waveguide 6 is arranged in a parallel manner on the outer side of the second input waveguide 2B in the input unit 4A in the interference region 4. Further, the MMI coupler 1A is configured such that the unnecessary light waveguides 5 is arranged in a parallel manner on the outer side of the first output waveguide 3A and the unnecessary light waveguides 5 is arranged in a parallel manner on the outer side of the second output waveguide 3B in the output unit 4B in the interference region 4.

The MMI couplers 1A illustrated in FIG. 8A to FIG. 8D are configured such that the unnecessary light waveguides 5 having the asymmetric rib optical waveguide structures are arranged in the output unit 4B in the interference region 4, and the unnecessary light waveguides 6 having the asymmetric rib optical waveguide structure are arranged in the input unit 4A in the interference region 4. As a result, even in the bidirectional MMI coupler 1A, the unnecessary light waveguides 5 and 6 are able to fully reduce the amount of reflected light that is input from the interference region 4 to the input waveguide 2 and the output waveguide 3, while meeting the single mode condition.

Meanwhile, the example has been described in which the MMI coupler 1 (1A) includes the unnecessary light waveguides 5 and 6 configured with the asymmetric rib optical waveguides, but embodiments are not limited to this example, and a different embodiment will be described below as a third embodiment.

[c] Third Embodiment

Figure 9:
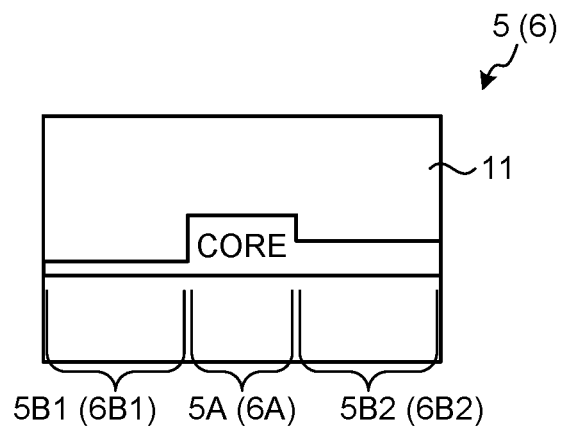
FIG. 9 is an explanatory diagram illustrating an example of a schematic cross-sectional portion of an unnecessary light waveguide of an MMI coupler of a third embodiment.

FIG. 9 is an explanatory diagram illustrating an example of a schematic cross-sectional portion of the unnecessary light waveguide 5 (6) of the third embodiment. The unnecessary light waveguide 5 (6) illustrated in FIG. 9 is an asymmetric rib optical waveguide that includes the rib portion 5A (6A), a first slab portion 5B1 (6B1) that is formed on one side of the rib portion 5A (6A), and a second slab portion 5B2 (6B2) that is formed on the other side of the rib portion 5A (6A). It is assumed that the unnecessary light waveguide 5 (6) is covered by a clad 11. The first slab portion 5B1 (6B1) has a smaller thickness than the second slab portion 5B2 (6B2). The second slab portion 5B2 (6B2) of the unnecessary light waveguide 5 (6) has a larger thickness than a thickness Hs of the slab portion in each of the input waveguides 2, the output waveguide 3, and the interference region 4.

The asymmetric rib optical waveguide as the unnecessary light waveguide 5 (6) of the third embodiment is configured such that the thickness of the first slab portion 5B1 (6B1) is smaller than the thickness Hs of the second slab portion 5B2 (6B2) that is located at the side of the output waveguide 3. Therefore, as compared to a case in which the first slab portion and the second slab portion have the same thicknesses Hs, optical confinement by the unnecessary light waveguide 5 (6) is weakened, so that it is possible to meet the single mode condition even if the waveguide width is increased. In other words, in the unnecessary light waveguide 5 (6) of the MMI coupler 1 of the third embodiment, it is possible to fully reduce the amount of reflected light that is input from the interference region 4 to the input waveguide 2 (the output waveguide 3), as compared to the unnecessary light waveguide 5 (6) that is configured with a rib waveguide in each of the MMI couplers 1 (1A) of the first embodiment and the second embodiment.

Meanwhile, in the MMI coupler 1 of the first embodiment, the example has been described in which the unnecessary light waveguides 5 arranged on the both sides of the output waveguide 3 are configured with linear waveguides, but embodiments are not limited to this example, and appropriate changes may be made. This embodiment will be descried below as a fourth embodiment.

[d] Fourth Embodiment

Figure 10:
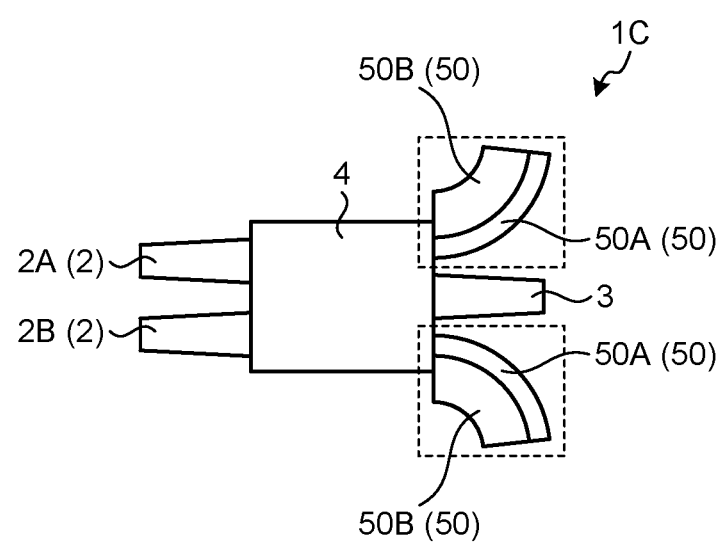
FIG. 10 is an explanatory diagram illustrating an example of a configuration of an MMI coupler of a fourth embodiment.

FIG. 10 is an explanatory diagram illustrating an example of a configuration of an MMI coupler 1C of the fourth embodiment. Meanwhile, the same components as those of the MMI coupler 1 of the first embodiment are denoted by the same reference symbols, and explanation of the same components and the same operation will be omitted. The MMI coupler 1C illustrated in FIG. 10 includes the two input waveguides 2 (2A and 2B), the single output waveguide 3, and the interference region 4 that optically couples the two input waveguides 2 and the single output waveguide 3. Further, the MMI coupler 1C includes unnecessary light waveguides 50 that are arranged in a parallel manner on both sides of the output waveguide 3 in the output unit 4B in the interference region 4. The unnecessary light waveguides 50 are asymmetric rib optical waveguides having curved structures. Each of the unnecessary light waveguides 50 has an asymmetric rib optical waveguide structure that includes a rib portion 50A and a slab portion 50B that has a smaller thickness than a core thickness of the rib portion 50A. The unnecessary light waveguides 50 are single-mode waveguides that guide only a fundamental mode of light. The rib portion 50A of each of the unnecessary light waveguides is a waveguide having a curved structure that is gradually separated from the output waveguide 3.

The MMI coupler 1C of the fourth embodiment is configured such that the unnecessary light waveguides 50 that are arranged in a parallel manner on the both sides of the output waveguide 3 have curved structures, so that it is possible to gradually reduce an influence of an unnecessary radiation mode that radiates in the unnecessary light waveguides 50 on the output waveguide 3.

[f] Fifth Embodiment

Figure 11:
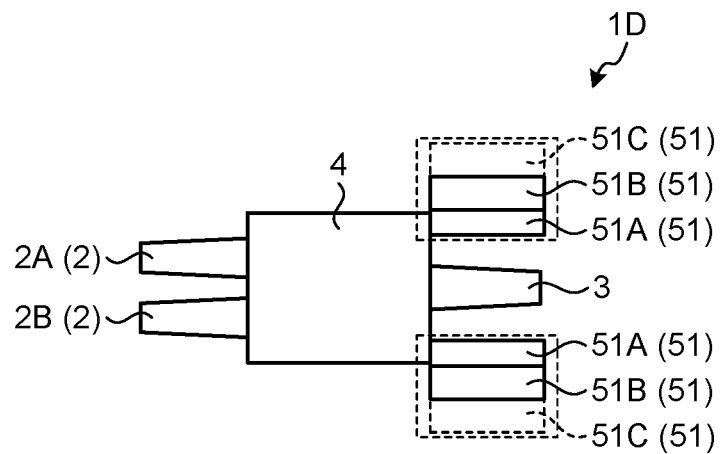
FIG. 11 is an explanatory diagram illustrating an example of a configuration of an MMI coupler of a fifth embodiment.

FIG. 11 is an explanatory diagram illustrating an example of a configuration of an MMI coupler 1D of a fifth embodiment. Meanwhile, the same components as those of the MMI coupler 1 of the first embodiment are denoted by the same reference symbols, and explanation of the same configuration and the same operation will be omitted. The MMI coupler 1D illustrated in FIG. 11 includes the two input waveguides 2 (2A, 2B), the single output waveguide 3, and the interference region 4 that optically couples the two input waveguides 2 and the single output waveguide 3. Further, the MMI coupler 1D includes unnecessary light waveguides 51 that are arranged in a parallel manner on both sides of the output waveguide 3 in the output unit 4B in the interference region 4.

Each of the unnecessary light waveguides 51 is an asymmetric rib optical waveguide that includes a rib portion 51A and a slab portion 51B that is formed on one side of the rib portion 51A. Furthermore, each of the unnecessary light waveguides 51 includes a doping area 51C in which a part or whole of the area of the slab portion 51B is doped. Meanwhile, doping is N-dope or P-dope. The doping area 51C is an area in which an unnecessary radiation mode that radiates in the unnecessary light waveguides 51 is optically coupled.

In the MMI coupler 1D of the fifth embodiment, a part or whole of the area of the slab portion 51B in each of the unnecessary light waveguides 51 that are arranged in a parallel manner on the both sides of the output waveguide 3 are doped, so that it is possible to reduce an influence of an unnecessary radiation mode in the unnecessary light waveguides 51, which radiates in the unnecessary light waveguides 51, on the output waveguide 3.

[f] Sixth Embodiment

Figure 12:
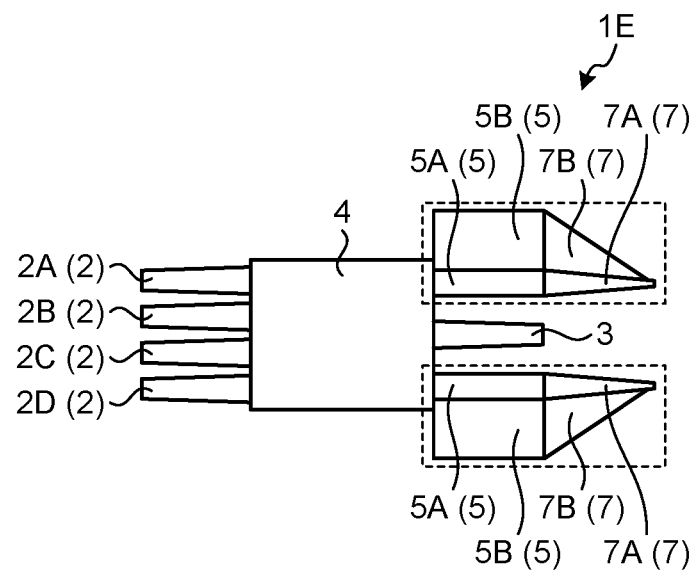
FIG. 12 is an explanatory diagram illustrating an example of a configuration of an MMI coupler of a sixth embodiment.

FIG. 12 is an explanatory diagram illustrating an example of a configuration of an MMI coupler 1E of the sixth embodiment. Meanwhile, the same components as those of the MMI coupler 1 of the first embodiment are denoted by the same reference symbols, and explanation of the same components and the same operation will be omitted. The MMI coupler 1E illustrated in FIG. 12 includes the four input waveguides 2 (2A and 2B, 2C, and 2D), the single output waveguide 3, and the interference region 4 that optically couples the four input waveguides 2 and the single output waveguide 3. Furthermore, the MMI coupler 1E includes the unnecessary light waveguides 5 that are arranged in a parallel manner on both sides of the output waveguide 3 in the output unit 4B in the interference region 4. The four input waveguides 2 include the first input waveguide 2A, the second input waveguide 2B, the third input waveguide 2C, and the fourth input waveguide 2D.

Each of the unnecessary light waveguides 5 is an asymmetric rib waveguide that includes the rib portion 5A and the slab portion 5B that is formed on one side of the rib portion 5A. The unnecessary light waveguides 5 are optically coupled with optical termination portions 7 that have reverse-tapered structures in which waveguide widths are reduced along a light traveling direction.

Each of the optical termination portions 7 includes a rib portion 7A whose waveguide width is reduced along the light traveling direction and which is optically coupled with the rib portion 5A in each of the unnecessary light waveguides 5, and a slab portion 7B whose waveguide width is reduced along the light traveling direction and which is optically coupled with the slab portion 5B in each of the unnecessary light waveguides 5. The optical termination portions 7 having the reverse-tapered structures terminate light that is guided in the unnecessary light waveguides 5, so that it is possible to prevent reflection of light in the unnecessary light waveguides 5.

The MMI coupler 1E of the sixth embodiment is configured such that the unnecessary light waveguides 5 that are arranged in a parallel manner on the both sides of the output waveguide 3 are coupled with the optical termination portions 7 having the reverse-tapered structures, so that light from the unnecessary light waveguides 5 is terminated and it is possible to prevent light from being reflected again in the unnecessary light waveguides 5.

Meanwhile, the example has been described in which the MMI coupler 1E of the sixth embodiment is configured such that the unnecessary light waveguides 5 are optically coupled with the optical termination portions 7 having the reverse-tapered structures, but embodiments are not limited to the optical termination portions 7 having the reverse-tapered structures, and appropriate changes may be made. Modifications of the MMI coupler 1E of the sixth embodiment are illustrated in FIG. 13 and FIG. 14.

Figure 13:
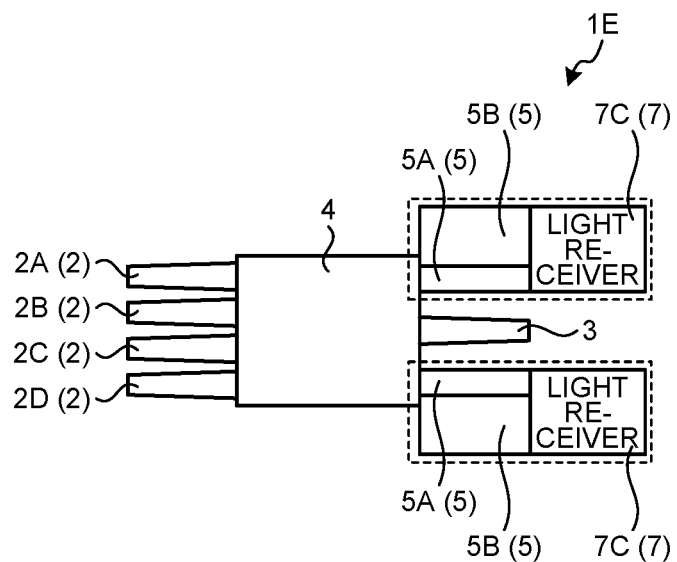
FIG. 13 is an explanatory diagram illustrating an example of an MMI coupler according to a modification of the sixth embodiment.

FIG. 13 is an explanatory diagram illustrating an example of a configuration of the MMI coupler 1E according to a modification of the sixth embodiment. Meanwhile, the same components as those of the MMI coupler 1E of the sixth embodiment are denoted by the same reference symbols, and explanation of the same components and the same operation will be omitted. The optical termination portions 7 that are optically coupled with the unnecessary light waveguides 5 in the MMI coupler 1E illustrated in FIG. 13 do not have the reverse-tapered structures, but are configured with light receivers 7C that perform current exchange on light that comes from the unnecessary light waveguides 5. The light receivers 7C perform current exchange on light that is guided by the unnecessary light waveguides 5, so that it is possible to prevent reflection of light in the unnecessary light waveguides 5.

The MMI coupler 1E illustrated in FIG. 13 is configured such that the light receivers 7C are optically coupled with the unnecessary light waveguides 5 that are arranged in a parallel manner on the both sides of the output waveguide 3, so that light from the unnecessary light waveguides 5 is subjected to current exchange and it is possible to prevent light from being reflected again in the unnecessary light waveguides 5.

Figure 14:
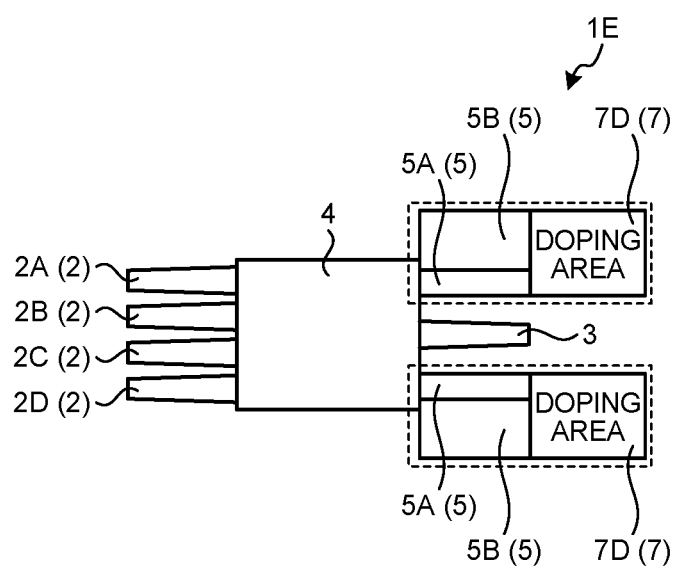
FIG. 14 is an explanatory diagram illustrating an example of an MMI coupler according to a modification of the sixth embodiment.

FIG. 14 is an explanatory diagram illustrating an example of a configuration of the MMI coupler 1E according to a modification of the sixth embodiment. Meanwhile, the same components as those of the MMI coupler 1E of the sixth embodiment are denoted by the same reference symbols, and explanation of the same components and the same operation will be omitted. The optical termination portions 7 that are optically coupled with the unnecessary light waveguides 5 in the MMI coupler 1E illustrated in FIG. 13 do not have the reverse-tapered structures, but are configured with doping areas 7D that perform thermal conversion on light that comes from the unnecessary light waveguides 5. The doping areas 7D perform thermal conversion on light that is guided in the unnecessary light waveguides 5, so that it is possible to prevent reflection of light in the unnecessary light waveguides 5.

The MMI coupler 1E illustrated in FIG. 14 is configured such that the doping areas 7D are optically coupled with the unnecessary light waveguides 5 that are arranged in a parallel manner on the both sides of the output waveguide 3, so that light that comes from the unnecessary light waveguides 5 is subjected to thermal conversion, and it is possible to prevent light from being reflected again in the unnecessary light waveguides 5.

Figure 15:
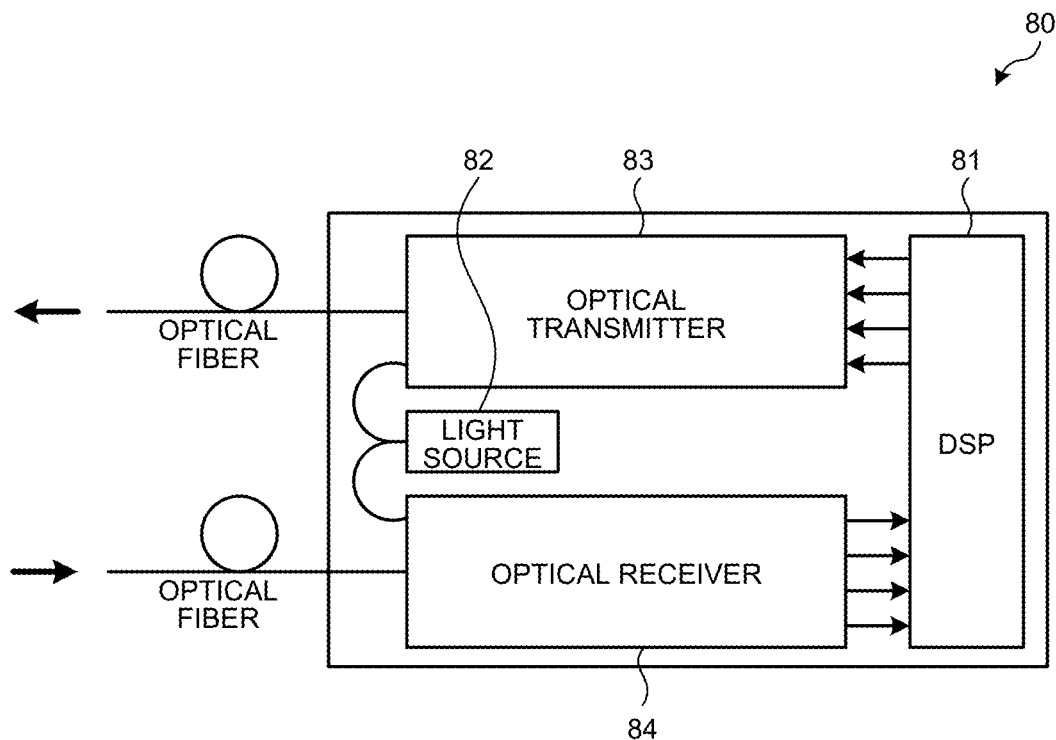
FIG. 15 is an explanatory diagram illustrating an example of an optical communication apparatus in which the MMI coupler of one embodiment is incorporated.
Figure 16:
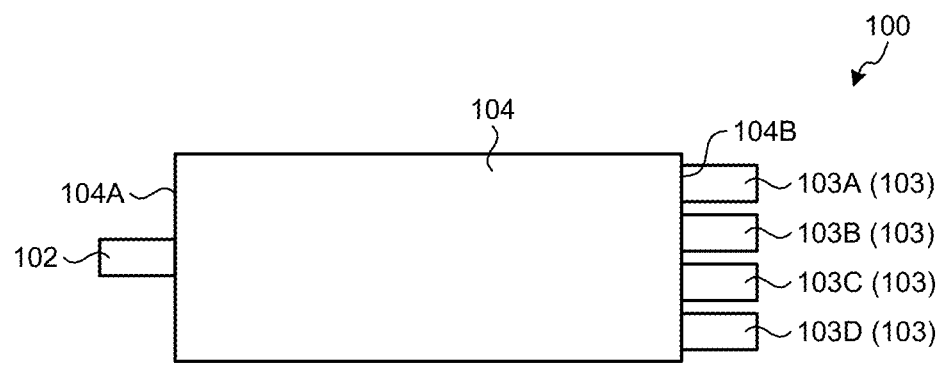
FIG. 16 is an explanatory diagram illustrating an example of a configuration of a conventional MMI coupler.
Figure 17:
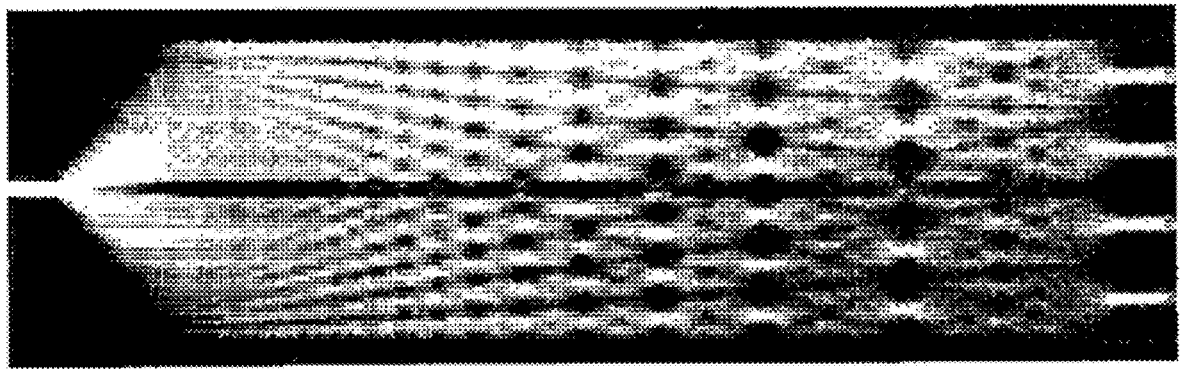
FIG. 17 is an explanatory diagram illustrating an example of an optical self-imaging effect of the MMI coupler illustrated in FIG. 16.
Figure 18:
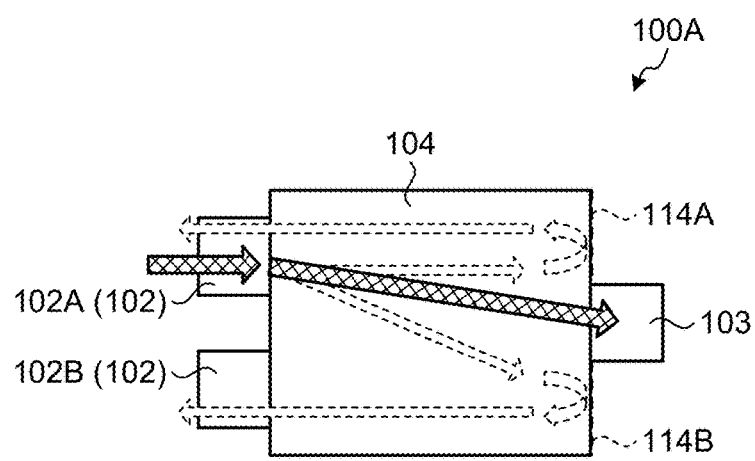
FIG. 18 is an explanatory diagram illustrating an example of a conventional 2×1 MMI couple.
Figure 19:
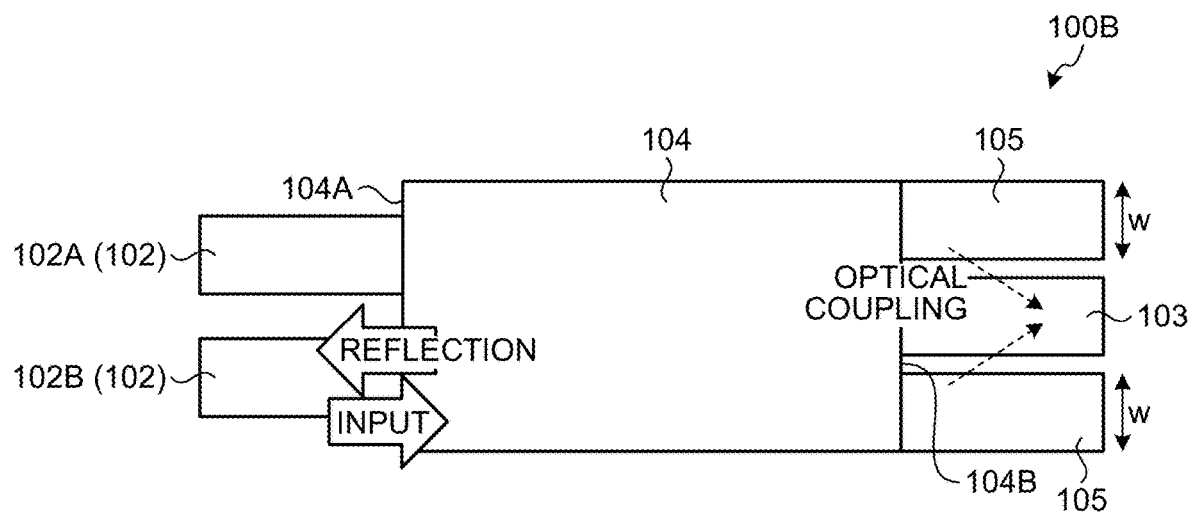
FIG. 19 is an explanatory diagram illustrating an example of a configuration of the conventional MMI coupler.
Figure 20:
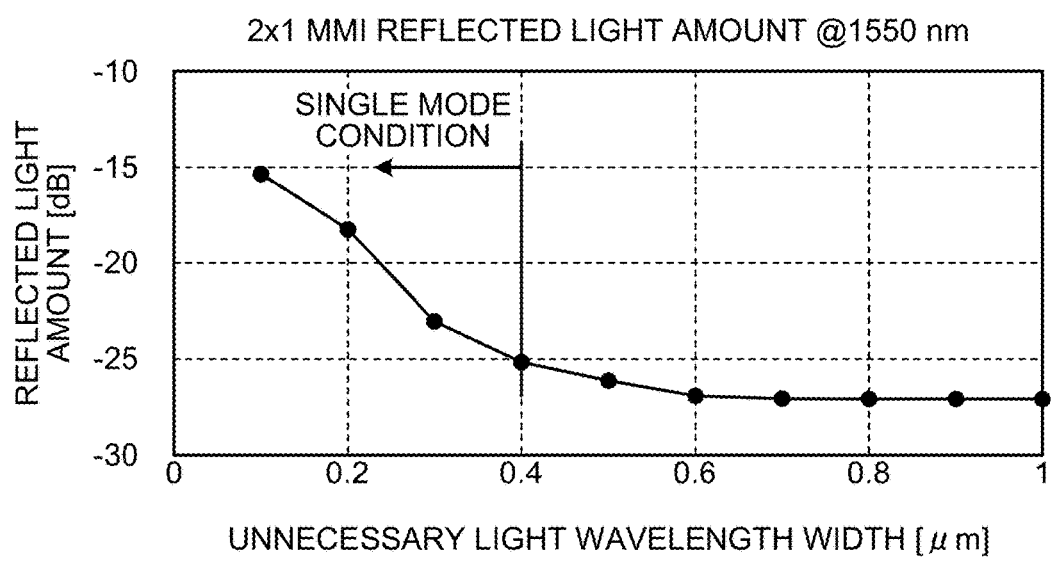
FIG. 20 is an explanatory diagram illustrating an example of a relationship between a waveguide width of an unnecessary light waveguide and an amount of reflected light in the conventional MMI coupler.

FIG. 15 is an explanatory diagram illustrating an example of an optical communication apparatus 80 in which the MMI coupler 1 of one embodiment is incorporated. The optical communication apparatus 80 illustrated in FIG. 15 is connected to an optical fiber at an output side and an optical fiber at an input side. The optical communication apparatus 80 includes a digital signal processor (DSP) 81, a light source 82, an optical transmitter 83, and an optical receiver 84. The DSP 81 is an electrical component that performs digital signal processing. The DSP 81 performs, for example, processing, such as encoding, on transmission data, generates an electrical signal including the transmission data, and outputs the generated electrical signal to the optical transmitter 83. Further, the DSP 81 acquires an electrical signal including reception data from the optical receiver 84, performs processing, such as decoding, on the acquired electrical signal, and obtains the reception data.

The light source 82 includes, for example, a laser diode or the like, generates light at a predetermined wavelength, and supplies the light to the optical transmitter 83 and the optical receiver 84. The optical transmitter 83 is an optical device that modulates light supplied from the light source 82 by using the electrical signal output from the DSP 81, and outputs obtained transmission light to an optical fiber. The optical transmitter 83, when the light supplied from the light source 82 propagates through the waveguide, modulates the light by an electrical signal that is input to an optical modulator, and generates transmission light.

The optical receiver 84 receives an optical signal from the optical fiber and demodulates received light by using light that is supplied from the light source 82. Further, the optical receiver 84 converts the demodulated reception light to an electrical signal, and outputs the converted electrical signal to the DSP 81. The optical transmitter 83 and the optical receiver 84 incorporate therein the MMI coupler 1 that guides light.

In the MMI coupler 1 in the optical communication apparatus 80, the unnecessary light waveguides 5 having the asymmetric rib optical waveguide structures are arranged in the output unit 4B in the interference region 4. As a result, the unnecessary light waveguides 5 are able to fully reduce the amount of light that is input from the interference region 2 to the input waveguide 2, while meeting the single mode condition.

Meanwhile, for convenience of explanation, each of the waveguides in the MMI coupler 1 may be a PLC in which a core and a clad are made of SiO$_2$, an InP waveguide, a GaAs waveguide, or a silicon nitride (SiN) waveguide, and appropriate changes may be made. It may be possible to adopt a Si waveguide in which a core is made of Si or Si$_3$N$_4$, a lower clad is made of SiO$_2$, and an upper clad is made of SiO$_2$, air, SiN, or the like, and appropriate changes may be made. In the case of the Si waveguide or the SiN waveguide, a relative refractive index difference is large, so that optical confinement is strengthened and it is possible to realize a low-loss curved waveguide with a small R; therefore, it is possible to reduce a size of the substrate optical waveguide element.

According to one aspect, it is possible to provide an optical device or the like including an unnecessary light waveguide that is able to reduce an amount of reflected light input to an input waveguide, while meeting the single mode condition.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical device comprising:
    an input waveguide;
    an output waveguide;
    an interference region that includes an input unit optically coupled with the input waveguide, that includes an output unit optically coupled with the output waveguide, and that has a larger waveguide width than a waveguide width of the input waveguide and a waveguide width of the output waveguide; and
    an unnecessary light waveguide that is included in the output unit in the interference region and that is arranged parallel to the output waveguide, wherein
    the unnecessary light waveguide is a single-mode waveguide that includes a rib portion and a slab portion with a smaller thickness than a thickness of the rib portion, and that guides only a fundamental mode of light.

2. The optical device according to claim 1, further including:
    a different unnecessary light waveguide that is included in the input unit in the interference region and that is arranged parallel to the input waveguide, wherein
    the different unnecessary light waveguide is a single-mode waveguide that includes a rib portion and a slab portion with a smaller thickness than a thickness of the rib portion of the different unnecessary light waveguide, and that guides only a fundamental mode of light.

3. The optical device according to claim 1, wherein
    each of the input waveguide, the output waveguide, and the interference region includes a rib optical waveguide that includes a first rib portion and a first slab portion with a smaller thickness than a thickness of the first rib portion, and
    the slab portion of the unnecessary light waveguide has a larger thickness than the thickness of the first slab portion.

4. The optical device according to claim 1, wherein the slab portion in the unnecessary light waveguide includes
    a first slab portion that is formed on one side surface of the rib portion; and
    a second slab portion that is formed on another side surface of the rib portion and that has a larger thickness than a thickness of the first slab portion.

5. The optical device according to claim 1, wherein the unnecessary light waveguide has a curved waveguide structure that is gradually separated from the output waveguide.

6. The optical device according to claim 1, wherein the slab portion in the unnecessary light waveguide includes a doping area in which one of a part and whole of an area of the slab portion is doped.

7. The optical device according to claim 1, further including:
    an optical termination portion that is optically coupled with the unnecessary light waveguide such that light that is guided by the unnecessary light waveguide is terminated.

8. A substrate optical waveguide element comprising:
    an input waveguide;
    an output waveguide;
    an interference region that includes an input unit optically coupled with the input waveguide, that includes an output unit optically coupled with the output waveguide, and that has a larger waveguide width than a waveguide width of the input waveguide and a waveguide width of the output waveguide; and an unnecessary light waveguide that is included in the output unit in the interference region and that is arranged parallel to the output waveguide, wherein the unnecessary light waveguide is a single-mode waveguide that includes a rib portion and a slab portion with a smaller thickness than a thickness of the rib portion, and that guides only a fundamental mode of light.

9. An optical communication apparatus comprising:

a light source;

an optical transmitter that optically modulates light coming from the light source by using a transmission signal, and transmits transmission light;

an optical receiver that receives a reception signal from reception light by using light coming from the light source; and a substrate optical waveguide element that guides the light in the optical transmitter and the optical receiver, wherein the substrate optical waveguide element includes an input waveguide;

an output waveguide;

an interference region that includes an input unit optically coupled with the input waveguide, that includes an output unit optically coupled with the output waveguide, and that has a larger waveguide width than a waveguide width of the input waveguide and a waveguide width of the output waveguide; and an unnecessary light waveguide that is included in the output unit in the interference region and that is arranged parallel to the output waveguide, the unnecessary light waveguide being a single-mode waveguide that includes a rib portion and a slab portion with a smaller thickness than a thickness of the rib portion, and that guides only a fundamental mode of light.

\* \* \* \* \*